Patented May 20, 1930

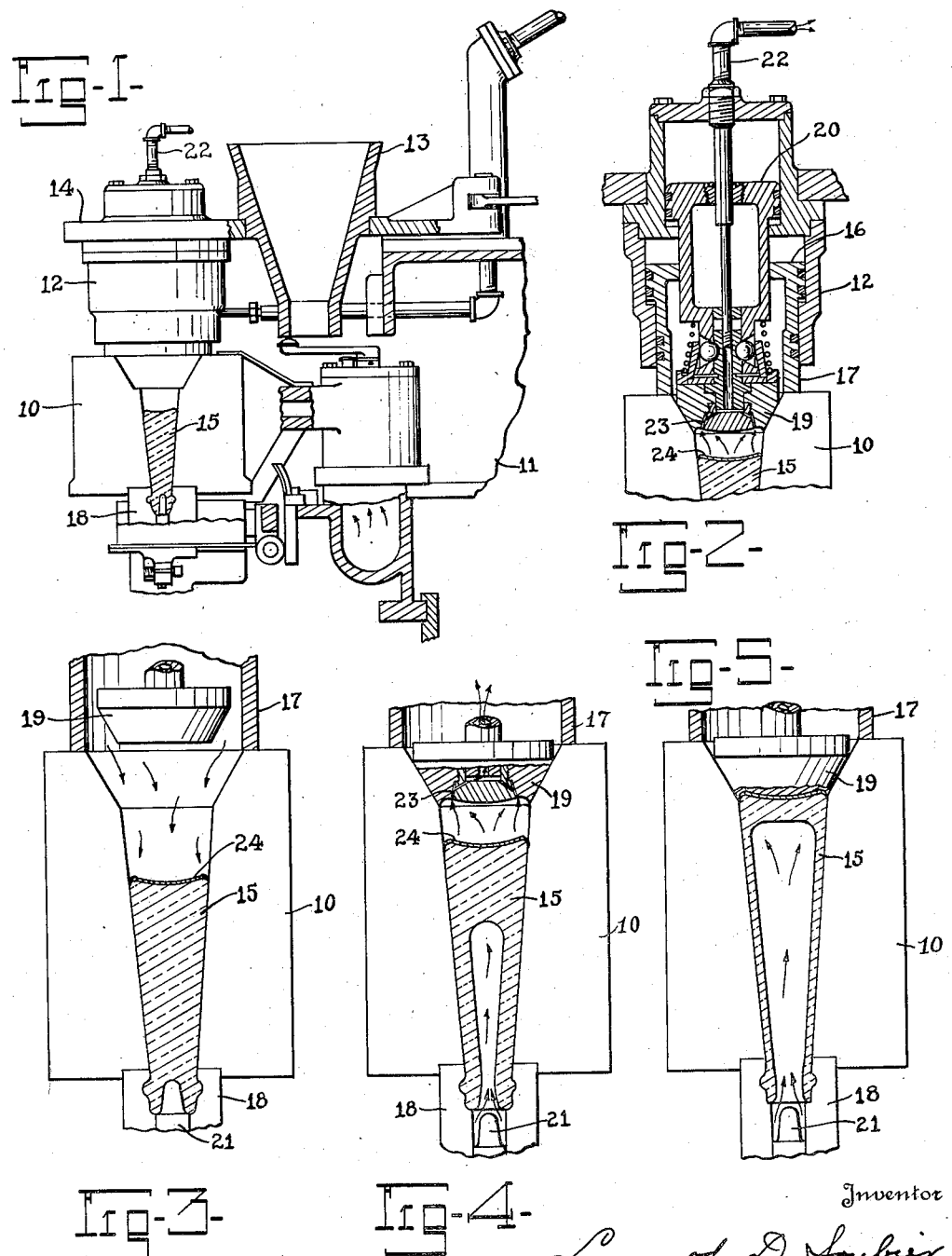

1,759,210

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

MACHINE FOR FORMING HOLLOW GLASSWARE

Application filed January 18, 1928. Serial No. 247,487.

My invention relates to machines for forming bottle or other hollow glassware, and particularly to the formation of the charges of glass in the molds. In certain types of machines of the character indicated, the charges of molten glass are introduced into the mold through the open upper end of the mold while the latter is in an inverted position. Air pressure is then applied to the upper surface of the glass to compact it in the mold. The parison is then blown to hollow form in the mold by air pressure applied at the lower end thereof. During this expansion, the glass is distributed over the entire surface of the mold cavity. It is found in practice that the distribution of the glass over the side walls of the mold is more or less uneven, giving to the side walls of the bottle or other formed article a wavy appearance, which is objectionable. This uneven distribution of glass is believed to be due in a measure to the fact that the upper surface of the charge of glass is more or less chilled when compacted in the mold in the manner above noted, and when air pressure is applied to expand the parison there is a tendency for the comparatively hot molten glass forming the interior of the parison to force its way upward, breaking through the chilled upper layer and spreading said chilled glass outward against the side walls of the mold. This results in an uneven distribution of the glass over said side walls.

An object of the present invention is to overcome this difficulty and for this purpose provision is made for exhausting the air from the space above the charge of glass in the mold, concurrently with the application of air pressure through the lower end of the mold for expanding the parison. The air pressure above the glass being thus removed, permits the upper chilled surface portion of glass to move upward in the mold as the parison expands, without being spread or distributed over the side walls. A more even distribution of glass is thus obtained so that the finished ware is free from the objectionable wavy appearance above pointed out.

Other objects of the invention will appear hereinafter.

In the accompanying drawings:

Fig. 1 is a part sectional elevation of a portion of a bottle blowing machine constructed in accordance with my invention.

Fig. 2 is a fragmentary view showing a blowing head in position on the mold and means for exhausting air from the mold.

Figs. 3, 4 and 5 are views illustrating different steps in the formation of the parison. Fig. 3 shows the blank being compacted in the mold. Fig. 4 shows the blank partially expanded by air supplied through the lower end of the mold. Fig. 5 shows the blank fully expanded.

Referring particularly to Fig. 1, the sectional blank mold 10 is mounted on a mold carriage 11 which may be of usual construction mounted to rotate about a vertical axis. A blowing head 12 and a funnel guide 13 are carried on a frame 14 mounted on the mold carriage and arranged to reciprocate radially thereof for bringing the blow head and funnel guide alternatively into position over the mold. After a charge of glass 15 has been introduced into the mold, the head 12 is brought into a position directly over the mold. A piston 16 having a sleeve extension 17 is then lowered onto the mold and air under pressure is supplied through said sleeve, as indicated by the arrows on Fig. 3, to compact the glass in the body blank mold 10 and the neck mold 18. A mold closing plug or head 19 carried by a piston 20 is then moved downward to seat in the mold, as shown in Figs. 2 and 4. The plunger tip 21 is then withdrawn from the neck mold and air under pressure supplied through the neck mold to blow the blank 15 to hollow form in the blank mold. The construction and operation of the blowing head 12 and associated mechanism are similar to those disclosed in the patent to Cramer, Number 1,590,423, June 29, 1926, to which reference may be had for a more detailed description.

While the parison is being blown to hollow form, suction is applied above the blank to withdraw the air which has been trapped in the mold between the plug 19 and the upper end of the parison. This suction is applied through a pipe 22 which extends downward through the center of the head 12 to the plug 19 and communicates with an annular port or passageway 23 within said plug. In this manner, the pressure on the upper surface of the glass during the expansion of the parison is maintained below atmospheric pressure. This materially facilitates the expansion of the glass, reducing the pressure required to blow the parison. Further, as there is no trapped air between the mold closing plug and the glass, the usual back pressure and the tendency to malformation of the parison are avoided. It will be noted that during the introduction and compacting of the glass in the blank mold, the upper surface is chilled, forming a surface layer skin 24 of comparatively cold glass. By exhausting the air from the space above the glass during the expansion of the parison, this surface layer is permitted to move bodily upward and forms the end surface of the blown parison. After the parison has thus been blown, the blowing head is withdrawn, the body blank mold opened and the parison transferred to a finishing mold, where it is blown to the form of the finished article.

Modifications may be resorted to within the spirit and scope of my invention.

What I claim is:

1. In a glass forming machine, the combination of a mold open at one end to receive a charge of glass, a head movable into position to close said end, means for supplying air under pressure through said open end into the mold and thereby compacting the glass in the mold, means for blowing the glass to hollow form in the mold by air supplied through the opposite end of the mold, and means for exhausting the air from the space between said head and the glass and maintaining sub-atmospheric pressure on the glass during substantially the entire said blowing of the parison.

2. In a glass forming machine, the combination of a mold open at its upper end to receive a charge of glass, a head movable into position to close said upper end, means for supplying air under pressure through said open end into the mold and thereby compacting the glass in the mold, means for blowing the charge of glass to hollow form in the mold by air supplied through the lower end of the mold, and means to exhaust the air from the space between said head and the glass and maintaining sub-atmospheric pressure on the glass during substantially the entire said blowing operation.

3. In a glass forming machine, the combination of a mold open at its upper end to receive a charge of glass, a head movable into position to close said upper end, means for supplying air under pressure through said open end into the mold and thereby compacting the glass in the mold, means for blowing the charge of glass to hollow form in the mold by air supplied through the lower end of the mold, said head being formed with air ports communicating with the mold cavity, and means to exhaust the air from the mold cavity through said ports and maintain sub-atmospheric pressure on the glass while the parison is being blown.

4. In a machine for forming hollow glass articles, the combination of an inverted blank mold open at its upper end to receive a charge of glass, means for applying air under super-atmospheric pressure to the upper surface of the glass and thereby compacting it in the mold, a closure device movable into position to close said open end of the mold, means for expanding the glass to hollow form in the mold by air pressure supplied to the lower end of the mold, and means for maintaining sub-atmospheric pressure in the mold above the glass throughout the period of said expansion.

5. In a machine for forming hollow glass articles, the combination of a mold open at one end to receive a charge of glass, a blowing head movable into engagement with said end of the mold, means for supplying super-atmospheric air pressure through said head and applying it to the glass in the mold, and means for applying suction through said head and exhausting the air from the mold.

Signed at Toledo, in the county of Lucas and State of Ohio, this 14th day of January, 1928.

LEONARD D. SOUBIER.